March 8, 1955     J. M. HOOPER     2,703,517
PLANTER TIRE
Filed May 11, 1951
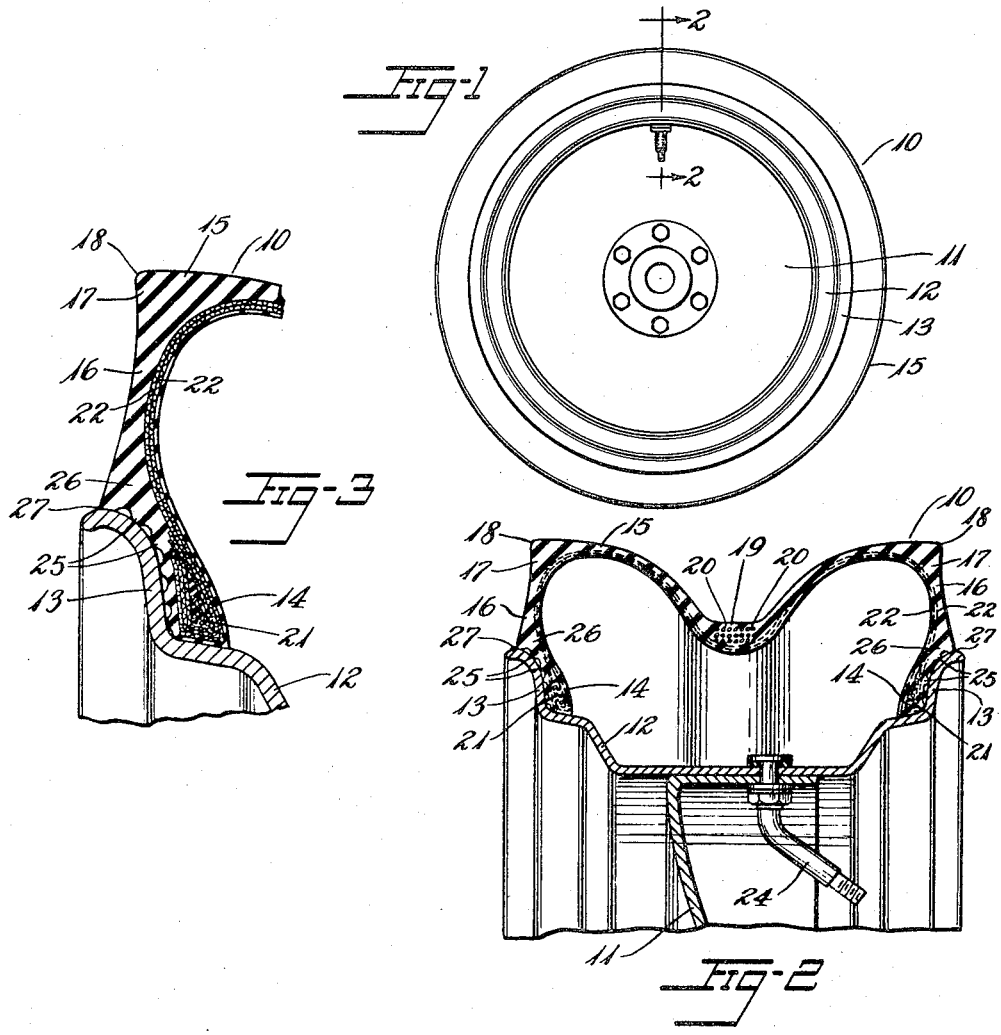
Inventor
James M. Hooper
By Harold S. Meyer
Atty.

United States Patent Office 2,703,517
Patented Mar. 8, 1955

2,703,517

PLANTER TIRE

James M. Hooper, Akron, Ohio, assignor to The B. F. Goodrich Company, New York, N. Y., a corporation of New York Application May 11, 1951, Serial No. 225,787

4 Claims. (Cl. 97—56)

This invention relates to tires for the press wheels of planting equipment suitable for row crops such for example as corn, beans and beets.

One of the most important factors in obtaining a good row crop is the proper planting of the seed. The seed should be planted at a proper and uniform seed depth and should be evenly covered with broken and softened soil. The soil covering should be compacted in direct contact with the seed to eliminate air spaces next to the seeds which cause rotting of the seed and delay germination of the seed.

When seeds are properly planted, germination takes place in the shortest possible time which gives the young plants an advantage over weed growth in that the young plants are large enough to cultivate at an early date.

It is also important in planting row crops that the seeds be planted in evenly spaced rows at all times. The straight evenly spaced rows enable the farmer to cultivate the crop with speed and efficiency without damaging the plants. This is difficult to accomplish where the soil has rocks which deflect the seeding runners and where the fields are on hillsides and the planters tend to slide down the hill.

Heretofore steel planter press wheels have been used which have had pairs of steel flanges with open centers. These press wheels have not conformed to the soil at all times and have not exerted pressure over the entire planted row because of the open centers. Also the steel press wheels have not cushioned the planter and have had a tendency to dig in, slip sideways, and pick up wet and dry soil which has not been desirable.

It is an object of the invention to provide a flexible tubeless press wheel tire that promotes proper planting of the seeds. A further object is to provide a tire having a smooth thread wall so shaped and constructed as to accommodate the planted row and effectively compact the soil over the planted row, to provide for conformance of the sidewall to the rim to deflect the soil away from the rim, to provide for directional stability of the tire, to provide cushioning of the planter by the tire, to provide a tire construction with a central constricting element and bead portions which may be built conveniently and economically and to provide for flexibility of the tire with transverse stability.

These and further objects will be apparent from the following description, reference being had to the accompanying drawings in which:

Fig. 1 is an elevation of a planter press wheel having a tire thereon constructed in accordance with and embodying the invention.

Fig. 2 is a cross-section taken along lines 2—2 of Fig. 1, part being broken away.

Fig. 3 is an enlarged fragmentary sectional view of the tire shown in Fig. 2.

The flexible hollow tire construction of the invention is of the tubeless type requiring no inner tube. The tire may be built for operation at low inflation pressures on the order of 5 to 10 pounds per square inch. In some of its aspects the invention is useful also in tires in which air under pressure does not need to be provided for inflating the tire.

By constructing the tire in accordance with the invention to accommodate the soil of the planted row in operation, it has been found that the troubles which have been experienced with metal planter wheels are reduced or eliminated entirely and that the planting is done with increased ease and success. This is shown by the marked superiority demonstrated in comparative field tests of crops planted with the planter press wheel tires of the invention over crops planted with metal press wheels.

With reference to the embodiment of the invention shown in Figs. 1 and 2, a pneumatic tire 10 of resilient rubber material which may be of the tubeless type as shown in the drawings or which may be used with an inner tube is mounted on a planter press wheel 11. The press wheel 11 has a drop-center rim 12 with flanges 13, 13 for retaining the tire 10.

The walls of the tire 10 terminate at the inner periphery in bead portions 14, 14 which seat upon the rim 12. At the outer periphery is a tread 15 which is the radially outermost layer of wear-resistant rubber-like material and which is connected to the bead portion by sidewalls 16, 16. The outer faces of the tread 15 and sidewalls 16, 16 are preferably smooth providing a surface to which soil does not readily adhere. Plies 22, 22 of suitable cords may be embedded in the tire wall from bead portion 14 to bead portion 14. The term "tire wall" includes the entire tire with the exception of the bead portion 14, 14. It consists of the two sidewalls and the tread portion. The tread wall or tread portion includes the tread 15 and that portion of the plies 22, 22 adjacent and radially inward of the tread 15. The term "sidewalls" includes that portion of plies 22, 22 between the bead portions 14, 14 and the tread portion, plus the side rubber covering axially outward thereof. The tread portion, as shown in Fig. 2 and Fig. 4, must necessarily be a generally thin wall, as such would be defined in the pneumatic tire art. A tread portion comprising two cord plies 22, 22 and having a total thickness averaging twice the aggregate thickness of the two cord plies has been found sufficiently flexible under the very light load normally used therewith.

The tread 15 has widely-spaced edge portions 17, 17 at the junction of the sidewalls 16, 16 and the tread 15. The widely-spaced edge portions 17, 17 substantially overlie the bead portions 14, 14 in the radial direction to accommodate the planted rows. The walls of the tire 10 are relatively thick at the edge portions 17, 17 to stiffen and maintain the tire shape and to provide a suitable wear-resisting surface.

At each of the edge portions 17, 17 the face of the adjacent sidewall 16 extends generally in the radial direction of the tire for resisting sideways slippage of the tire in soft soil or on the side of a hill and the face of the tread 15 at the edge portion extends generally in an axial direction of the tire to provide a flat wear-resisting supporting surface. These faces of the tread 15 and the sidewalls 16, 16 intersect at a substantially sharp angle on the order of 90 degrees providing widely-spaced penetrating edges 18, 18 at the radially outermost extremities of the tire for engaging the ground to resist sideways slippage.

The intervening wall of the tread portion between the edge portions 17, 17 is relatively thin with respect to the edge portions and is inclined inwardly continuously in the axial and radial directions from the penetrating edges 18, 18 to a middle portion 19 to provide the maximum area of inwardly inclined tread surface for forming the soil of the planted row. The inner surfaces of edge portions 17, 17 have a substantially greater circumference than the circumference of the outer surface of the middle portion which has the smallest circumference in the tread portion providing a channel in the tread 15 extending circumferentially of the tire for accommodating the soil of the planted row. The flexibility of the relatively thin tread wall disposed between the relatively thick edge portions 17, 17 permits the tire to conform to the contour of the ground and presents a flexible tread surface to which soil and mud does not readily adhere.

The pneumatic tire 10 has suitable circumferentially extending constricting elements 20, 20 such as nylon cord, rayon cord, cotton or wire embedded in the tread in the middle portion 19 which has the minimum circumference of the tread to restrain the middle portion against forces exerted outwardly by the air pressure in the tire. Bead rings 21, 21 of wire or other suitable material are embedded in the bead portions 14, 14 and plies 22, 22 of suitable cords such as nylon, rayon or cotton may be embedded in the tire wall and extend from bead portion to bead portion for reinforcing the tire body. The portion of plies 22, 22 in the tread portion of the tire is restricted in the middle portion 19 by constricting elements 20, 20 restraining this portion of plies 22, 22 so that they incline inwardly continuously in the axial and radial directions, generally parallel to the tread, thus allowing for the desired tread profile without the necessity of extra tread thickness to obtain this profile. This constantly thin tread portion provides the flexibility desired in the tire operation.

The circumference of the middle portion 19 of the tread 15 which has a circumference equal to substantially one half the sum of the circumference of the bead portions 14, 14 and the edge portions 17, 17 may be substantially the same as the circumference of the rim flanges 13, 13 and is only slightly greater than the circumference of the bead portions 14, 14. This facilitates building of the tire 10 because the small difference between the circumference of the bead portions 14, 14 and the circumference of the middle portion 19 makes it possible to build the tire on a low crown building drum.

The tire 10 has relatively short sidewalls 16, 16 which require a minimum amount of material and which provide good columnar support for the edge portions 17, 17 of the tread 15 because of the low ratio of the radial width to the thickness of the sidewalls. The radial width of the sidewalls may be less than half the width of the tire 10 measured between the corner edges 18, 18 of the edge portions 17, 17 to provide the desired action on the soil.

As shown in Fig. 2 the tire 10 is used without an inner tube with the air being confined within the walls of the rim 12 and the tire. A valve 24 is mounted in the rim 12 to transmit air into the air chamber within the tire 10 and rim. Suitable air sealing means such as circumferential ribs 25, 25 are disposed on the faces of the bead portions 14, 14 which engage the rim flanges 13, 13. The outer faces of the sidewalls 16, 16 extend radially inward and are flared outwardly to rim-sealing portions 26, 26 which are relatively thick so that lips 27, 27 at the edges of the rim-engaging faces of the bead portions overlap the radially outermost edges of the rim flanges. The outwardly flared faces of the rim-sealing portions 26, 26 deflect the soil away from the rim flanges and the lips 27, 27 seal the joints between the tire and rim flanges against entrance of soil between the air-sealing faces of the rim flanges and the tire. An inner lining of highly impermeable material may be adhered to the inner wall of the tire if desired. However, operation of the tire 10 without an inner lining is feasible because the tire is operated at low inflation pressures and at slow speeds under light loads which operation does not cause appreciable heating of the tire and therefore the danger of ply separation is slight.

In operation, the tire 10 rolls over the soil of the planted row with the widely-spaced edge portion 17, 17 at the sides of the row guiding the wheel along the row and resisting sideslip of the tire by means of the corner edges 18, 18 which are especially effective when the tire is operated on the sides of hills and on other rough terrain. The entire smooth surfaced, relatively thin, flexible intervening wall portion of the tread wall, located between the relatively thick edge portions 17, 17, is inclined inwardly continuously in the radial and axial direction to the middle portion 19 forming a channel to accommodate the soil of the planted row and compact the soil around the seeds while conforming to the contour of the ground. In wet soil where the earth has a tendency to stick to the planter wheels the tire 10 presents a smooth, highly flexible tread surface and flared sidewall surfaces to which the soil does not easily adhere.

Variations may be made without departing from the scope of the invention as it is defined in the following claims.

I claim:

1. An agricultural press wheel tire and rim assembly comprising a drop-center rim having radial flanges, an annular hollow body of rubber material terminating in spaced-apart bead portions seated upon said rim, a tread portion and sidewalls connecing said bead portions and said tread portion, plies of reinforcing fabric material embedded in said body of rubber material and extending from bead portion to bead portion, sealing ribs at the outer flange-engaging faces of said bead portions, said tread portion having a wall with edge portions of substantially greater thickness than the portions therebetween and an intervening middle portion, the circumference of said middle portion being substantially the same as the circumference of the radial flanges of the rim and a circumferentially extending constricting element embedded in said middle portion radially outward of the fabric plies therein to retain said middle portion and the fabric plies therein in a position radially inward of said edge portions and the fabric plies therein providing a circumferentially extending channel in said tread portion and said fabric plies for accommodating the soil of a planted row, said sidewalls having rim-engaging faces and relatively thick portions with outwardly flared faces at the edges of said rim-engaging faces and lips extending outwardly therefrom in the axial direction of the tire for overlapping the radially outermost edges of the rim flanges to provide a smooth junction between said sidewalls and the rim flanges.

2. A pneumatic agricultural press wheel tire, for mounting on a rim having bead seats and radial tire retaining flanges, said tire comprising a hollow annular carcass formed of spaced apart substantially inextensible beads with plies of reinforcing textile material connecting said beads; a layer of rubber overlying said carcass to form tire bead portions, sidewalls and a tread; the bead portions of said tire having outer rim-flange engaging faces formed with sealing ribs, the edges of said tread at said sidewalls being substantially thicker than the tread portions extending from said edges, the mid-portion of said tread being disposed radially inwardly of the edges of the tread to provide a circumferential channel in the tread, the circumference of said mid-portion being substantially the same as the outer circumference of the radial flanges of the rim upon which the tire is mounted, a circumferentially extending constricting element embedded in the mid-portion of said tread to maintain said circumferentially extending tread channel in said mid-portion of the tread for transversely compacting the soil of a planted row, said sidewalls having relatively thick portions with outwardly flared faces disposed adjacent to and radially outwardly of the rim-engaging faces of said bead portions and forming lips extending generally axially outwardly for overlapping and seating upon the radially outermost edges of the rim flanges to provide a smooth soil deflecting junction between said lips and the rim flanges.

3. A pneumatic agricultural press wheel tire, for mounting on a rim having bead seats and radial tire retaining flanges, said tire comprising a hollow annular carcass formed of spaced apart substantially inextensible beads with plies of reinforcing textile material connecting said beads; a layer of rubber overlying said carcass to form tire bead portions, sidewalls and a tread; the bead portions of said tire having outer rim-flange engaging faces formed with sealing ribs, the edges of said tread at said sidewalls being substantially thicker than the tread portions extending from said edges, the mid-portion of said tread being disposed radially inwardly of the edges of the tread to provide a circumferential channel in the tread, the circumference of said mid-portion being substantially the same as the outer circumference of the radial flanges of the rim upon which the tire is mounted, a circumferentially extending constricting element embedded in the mid-portion of said tread to maintain said circumferentially extending tread channel in said mid-portion of the tread for transversely compacting the soil of a planted row, said sidewalls having a radial extent that is substantially less than the axial width of said tread.

4. A pneumatic agricultural press wheel tire, for mounting on a rim having bead seats and radial tire retaining flanges, said tire comprising a hollow annular carcass formed of spaced apart substantially inextensible beads with plies of reinforcing textile material connecting said beads; a layer of rubber overlying said carcass to form tire bead portions, sidewalls and a tread; the bead portions of said tire having outer rim-flange engaging faces formed with sealing ribs, the edges of said tread at said sidewalls being substantially thicker than the tread portions extending from said edges, the mid-portion of said tread being disposed radially inwardly of the edges of the tread to provide a circumferential channel in the tread, the circumference of said mid-portion being substantially the same as the outer circumference of the radial flanges of the rim upon which the tire is mounted, a circumferentially extending constricting element embedded in the mid-portion of said tread radially outward of said textile plies to maintain said circumferentially extending tread channel in said mid-portion of the tread for transversely compacting the soil of a planted row, said sidewalls having relatively thick portions with outwardly flared faces disposed adjacent to and radially outwardly of the rim-engaging faces of said bead portions and forming lips extending generally axially outwardly for overlapping and seating upon the radially outermost edges of the rim flanges to provide a smooth soil deflecting junction between said lips and the rim flanges.

References Cited in the file of this patent

UNITED STATES PATENTS

| | | |
|---|---|---|
| 639,100 | Schroeder et al. | Dec. 12, 1899 |
| 922,631 | Reddaway | May 25, 1909 |
| 1,091,379 | Mussinan | Mar. 24, 1914 |
| 1,092,353 | Hallanan | Apr. 7, 1914 |
| 1,293,528 | Palmer | Feb. 4, 1919 |
| 1,915,963 | Wait | June 27, 1933 |
| 2,563,787 | Keefe | Aug. 7, 1951 |
| 2,601,464 | Tanke | June 24, 1952 |

FOREIGN PATENTS

| | | |
|---|---|---|
| 18,284 | Great Britain | 1893 |
| 607,026 | France | Oct. 30, 1925 |
| 42,198 | Denmark | Apr. 29, 1930 |
| 725,451 | France | Feb. 12, 1932 |